United States Patent [19]

Preston et al.

[11] 4,124,574

[45] Nov. 7, 1978

[54] POLY (OXYALKYLENE) GLYCOL BASED POLYURETHANE WITH IMPROVED PAINT ADHESION PROPERTIES

[75] Inventors: Frank J. Preston, Meriden; David R. MacFarland, Cheshire, both of Conn.

[73] Assignee: Olin Corporation, New Haven, Conn.

[21] Appl. No.: 828,380

[22] Filed: Aug. 29, 1977

[51] Int. Cl.² .............................................. C08G 18/48
[52] U.S. Cl. ...................................................... 528/76
[58] Field of Search ................ 260/77.5 AP, 77.5 AM

[56] References Cited

U.S. PATENT DOCUMENTS

| 3,336,242 | 8/1967 | Hampson et al. | 260/77.5 AP |
|---|---|---|---|
| 3,915,937 | 10/1975 | O'Shea | 264/328 |
| 3,983,094 | 9/1976 | O'Shea | 260/77.5 AM |
| 4,041,105 | 8/1977 | O'Shea et al. | 260/859 R |

OTHER PUBLICATIONS

Automotive Engineering, vol. 82, No. 1, Jan. 1974, "Engineer's Guide to Thermoplastic Elastomers".
Critchfield et al., Journal of Elastomers & Plastics, vol. 8, Oct. 1976, pp. 396–402.

*Primary Examiner*—M. J. Welsh
*Attorney, Agent, or Firm*—Robert J. Feltovic; Thomas P. O'Day

[57] ABSTRACT

Flexible polyurethane elastomers suitable for use as automotive exterior body parts are disclosed. The elastomers which are produced from select polymeric diols having a polyoxypropylene block capped with a random poly (oxyethylene-oxypropylene) structure, feature enhanced paint adhesion properties.

21 Claims, No Drawings

POLY (OXYALKYLENE) GLYCOL BASED POLYURETHANE WITH IMPROVED PAINT ADHESION PROPERTIES

Flexible exterior body parts for automobiles require specific physical properties. In particular, the part must be capable of flexing under impact, be characterized by high tensile and tear strength, and exhibit neither cracking at low temperatures nor distortion under high temperature paint drying conditions. An additional inherent requirement for applications such as automotive body part usage is that the elastomeric material must be compatible with available commercial polyurethane paints.

In order to meet trade standards, it is understood that elastomeric materials must possess certain minimum physical qualities. A modulus of elasticity at $-30°$ C. of less than 85000 psi coupled with an elongation of at least 150% at this temperature generally ensures that an elastomeric body part will pass a $-30°$ C. automotive impact test (see S.A.E. Report No. 741,023, Automobile Engineering Meeting — Toronto, Canada (Oct. 21-25, 1974)). Regarding high temperature thermal stability for paint drying purposes, an elastomeric material commonly is judged acceptable if it passes the standard General Motors Heat Sag Test Method CTZ ZZ006A (maximum 2 inches).

Polyurethane elastomeric materials have been found to be particularly useful for these automotive applications. In U.S. Pat. No. 3,915,937, flexible automobile exterior body parts are described that are molded from a polyurethane elastomer prepared by reacting a poly (oxypropylene) glycol or an ethylene oxide "tipped" poly (oxypropylene) glycol of a molecular weight of from about 1,750 to about 2,500 with methylene bis-(4-phenyl isocyanate) and 1,4-butane diol. A comparably used polyurethane elastomer, reported as featuring improved thermal stability, is disclosed in U.S. Pat. No. 3,983,094. Here, the elastomeric body part is produced from a formulation of methylene bis-(4-phenyl isocyanate), 1,4-butane diol, and a polymeric diol defined as a poly (oxypropylene)-poly (oxyethylene) glycol of a molecular weight of about 1,750 to about 4,000 containing 15 to 50% by weight oxyethylene groups.

Polyols that are all-poly (oxypropylene) glycols, exemplified by those shown in U.S. Pat. No. 3,915,937, are beset by two major drawbacks. The first inadequacy of these type glycols is their low reactivity relative to chain extenders, typically difunctional active hydrogen-containing compounds. This low relative reactivity results in unsatisfactory elastomer formation in reaction with an isocyanate. The second drawback is the low thermal stability of the elastomeric product formed. Thermoplastic urethane elastomers, formed even by the prepolymer method, are not heat stable during processing operations, which leads to degradation of physical properties in the extruded or injection molded product.

It has been found that the use of poly (oxyethylene) capping on poly (oxypropylene) glycol precursors distinctly enhances the physical properties of elastomers prepared from these polyols. The ethylene oxide tipping provides primary hydroxyl groups on the glycol which are much more closely reactive in relation to chain extending diols. Further, the elastomers produced from ethylene oxide tipped glycols exhibit improved thermal stability over poly (oxypropylene) glycols. However, the ethylene oxide tipped glycols are not devoid of critical deficiencies.

U.S. Pat. No. 3,983,094 notes that poly (oxypropylene)-poly (oxyethylene) glycols containing greated than 15 percent by weight oxyethylene groups produce urethane elastomers having improved properties for automotive applications. Indeed, it has been determined that even greater percentages of oxyethylene group content, between about 30 to about 60 percent, results in even more improved elastomers. But, along with these improving physical properties, it has now been found that as the weight proportion of ethylene oxide "tipping" increases in the glycol, polyurethane elastomer products become increasingly inferior in paint adhesion. This characteristic is a particularly marked deficiency for automotive parts usage, where color matching and paint durability is of critical importance.

Now, according to the present invention, unexpectedly, it has been discovered that using polyether glycols synthesized by selected random oxyethylene-oxypropylene oxyalkylation of a poly (oxypropylene) glycol precursor produces polyurethane elastomers featuring physical properties comparable with the all-poly (oxyethylene) capped poly (oxypropylene) glycol precursors of the prior art, and, most importantly, demonstrate advantageous paint adhesion properties.

The polyurethane elastomers of the present invention are prepared by reacting the select polyether glycols with chain extenders and an organic diisocyanate, according to standard procedures known in the art. The polyether glycols suitable for use are characterized as ethylene oxide-propylene oxide capped poly (oxypropylene) glycols. The molecular weight of the polyols ranges from about 1,500 to about 3,000, preferably about 1,750 to about 2,500, and most preferably about 2,000. The poly (oxypropylene) glycol precursor can be prepared by known prior art oxyalkylation techniques by condensing propylene oxide with a difunctional active hydrogen-containing initiator. Typical initiators include water and any of the common aliphatic diols, such as propylene glycol, dipropylene glycol, tripropylene glycol, ethylene glycol, butylene glycol, butane 1,4, diol, and the like. Dipropylene glycol is the preferred initiator.

As described above, the polyether glycols are formulated by oxyalkylating a poly (oxypropylene) glycol precursor with ethylene oxide including a proportion of propylene oxide. The propylene oxide in the capping block should be present in an amount ranging from about 3 to about 15 percent by weight of the capping block, preferably about 5 to about 10 percent. The overall capping block is applied in such an amount that the final ethylene oxide content of the polyol ranges from about 30 to about 60 percent by weight of the polyol, preferably about 40 to about 50 percent, and most preferably about 45 percent.

The poly (oxypropylene)-poly (oxyethylene-oxypropylene) glycols are utilized to form the soft, elastic segment of the polyurethane elastomers of the present invention. The strong, rigid, or "hard" segment of the resulting elastomers is formed by the diisocyanate and chain extender components. Chain extending agents generally are difunctional active hydrogen-containing compounds, such as water, glycols, diamines, or aminoalcohols. These agents serve to render a higher molecular weight, polymer. Any of the commonly known chain extending agents for polyurethane elastomers may be employed; of particular utility in elastomer applications are difunctional aliphatic diols such as ethylene glycol, propylene glycol, butane diol, pentane diol, hexane diol, and the like. 1,4-butane diol is the preferred chain extender. Diisocyanates used may be any of those known in the art for polyurethane usage. Typical diisocyanates are tolylene diisocyanate, methylene bis(phenyl isocyanate), bibenzyl diisocyanate, phenylene diisocyanate, hexamethylene diisocyanate, and the like. Preferred diisocyanate reactants are tolylene diisocyanate, such as the 80/20 and 65/35 mixtures of the 2,4- and 2,6-isomers, and 4,4'-methylene bis (phenyl isocyanate).

The actual reactant proportions utilized for the polyurethane elastomer-forming reaction may be any of those commonly known in the art. In general, about 4 to about 30 parts, preferably about 12–18 parts, by weight of the chain extender is used per every 100 parts of polyol reactant. The amount of diisocyanate employed generally should be sufficient to provide at least about 0.95 to about 1.05, preferably about 1.00 to about 1.02, NCO groups per each hydroxy group present in the elastomer-forming reaction mixture.

Other additives commonly used in polyurethane elastomer-forming reactions may also be incorporated, if desired. Additives that may be advantageous to use include lubricants, such as silicone oils, waxes, and fatty acid esters; antioxidants; U. V. stabilizers; and plasticizers. It may also be beneficial to employ a catalyst for the elastomer-forming reaction. Any of the catalysts, or mixtures thereof, known in the art to catalyze polyurethane elastomer reactions may be employed preparing the elastomer of the present invention. These catalysts include tertiary amines, mixtures thereof, organo-metallic salts, and mixtures of one or more tertiary amines with an organo-metallic salt. Typical tertiary amines and organo-metallic salts that can be used are listed in U.S. Pat. No. 3,931,066.

The polyurethane elastomers of the present invention may be prepared using either the prepolymer process or the so-called "one-shot" technique. In the prepolymer process, polyol is reacted with diisocyanate to form an isocyanate-terminated prepolymer which is then reacted with a chain extender to form the elastomer product. The "one-shot" technique involves the reaction of the polyol, diisocyanate, and chain extender all in one step.

Production of flexible polyurethane automotive body parts, using the elastomer of the present invention, can be accomplished by any of the standard fabrication procedures. The prepared elastomer can be diced and fed to an injection molding device, or can be extruded and vacuum formed. Parts can also be produced using reaction injection molding (RIM) techniques. RIM involves injecting the polyurethane forming reactants directly into a mold where they react and cure to form the desired article. Flexible exterior body parts can readily be prepared, such as fender extensions, full fascia front and rear ends, sight shields, and parts associated with energy-absorbing bumper systems.

The following examples are provided to illustrate the invention and demonstrate the improved properties of the invented polyurethane elastomers over those of the prior art.

Comparative Example A demonstrates a poly (oxypropylene) glycol based polyurethane elastomer, according to the prior art. As discussed above, these type polyols are beset by inadequacies including the tendency to degrade under extrusion conditions. Although these polyurethane elastomers generally pass the paint adhesion test, their thermal instability renders them undesirable for use.

To illustrate the reduction in paint adhesiveness encountered when attempting to engender improved thermal stability by ethylene oxide capping, Comparative Examples B, C, and D are provided. In Comparative Example B, a poly (oxypropylene) glycol is capped with a 45% by weight poly (oxypropylene) block; in Comparative Example C, the 45% by weight poly (oxyethylene) cap includes 1-2% poly (oxypropylene); in Comparative Example D, the glycol initiator is random oxyalkylated with ethylene oxide and propylene oxide to result in a 45% by weight poly (oxyethylene) polyol. None of these polyols successfully produces a polyurethane elastomer with acceptable paint adhesion qualities. Comparative Example C approaches the concept of the present invention, and does feature improved paint adhesion, but does not contain the critical minimum amount of poly (oxypropylene) in the poly (oxyethylene) cap in order to successfully pass the standard test of the industry. Finally, Examples I and II clearly illustrate the improvement of the present invention.

The polyurethane elastomer samples of the examples were tested for various physical properties including hardness, tensile strength, elongation, tear strength, and torsional modulus (Clash Berg) according to ASTM 1564-64. The tests of paint adhesion quality of the samples were conducted according to the standard Ford Motor Company Paint Adhesion Test. This procedure involves spray-painting the sample pieces and then baking them at 250° F. for either 20 or 30 minutes. The samples are then cooled to room temperature and a one inch square section of the painted sample is razor-cut cross-hatched into one hundred individual sections. A piece of adhesive tape (3M # 710) is applied to the cross-hatched section and then peeled off. If any of the cross-hatched sections fail to adhere to the polyurethane sample and tear off with the tape, the sample fails the test.

All parts and percentages in the examples are by weight unless otherwise specified.

COMPARATIVE EXAMPLE A

An all-poly (oxypropylene) glycol based polyurethane elastomer was prepared and tested in the following manner.

One thousand six hundred and eight (1,608) grams of 4,4'-methylene bis (phenyl isocyanate) was reacted with two thousand one hundred and eight (2,108) grams of a 2000 molecular weight poly (oxypropylene) glycol which had been degassed at 100° C. and 2 mm mercury vacuum for 30 minutes. The poly (oxypropylene) glycol (formulated by oxyalkylation of a dipropylene glycol initiator with propylene oxide to a hydroxyl number of 56) contained 0.5% by weight of a high molecular weight hindered-phenolic antioxidant (commercially available as Irganox ® 1010 from Ciba-Geigy) and 0.5% by weight of a substituted benzotriazole ultraviolet absorber (commercially available as Tinuvin ® 328 from Ciba-Geigy). The mixture of isocyanate and polyol was heated to 85° C. for two hours under an atmosphere of dry nitrogen to produce a prepolymer having an equivalent weight of 356.84.

To one hundred parts of the prepolymer, 12.39 parts of 1,4-butane diol was added at 60° C. These reactants were mixed, and the mixture was poured into teflon coated pans and cured at 110° C. for 16 hours. The resulting polyurethane castings, containing 50% soft segment, were then compression-molded into 6 × 6 × ⅛ inch sheets, as test panels.

The test panels exhibited the following physical properties:

| | |
|---|---|
| Hardness Shore A | 91 |
| Tensile Strength, psi | 2925 |
| Elongation, % | 453 |
| Die C Tear, lbs/in | 384 |
| Clash Berg | −38.5° C |

The test panels were then prepared for paint adhesion testing by post curing the samples at 275° F. for 30 minutes. The unprimed sample panels were spray painted with Durathane ® 100 (a polyurethane paint obtained from PPG*) and baked at 250° F. for 20 or 30 minutes. The samples were then cooled to room temperature. These all-poly (oxypropylene) glycol based polyurethane elastomer castings passed the tape paint adhesion test for both 20-minute and 30-minute bake cycles.

* Pittsburgh Plate Glass Corporation.

COMPARATIVE EXAMPLE B

A poly (oxypropylene)-poly (oxyethylene) glycol based polyurethane elastomer was prepared and tested in the following manner.

One mole (2000 g) of a 2000 molecular weight poly (oxypropylene) glycol containing 45% by weight of ethylene oxide tipping (prepared by oxypropylating a dipropylene glycol initiator to a hydroxyl number of 101.8, followed by capping with 20 moles of ethylene oxide to a final hydroxyl number of 56.0) was reacted with four moles of 1,4-butane diol and five moles of 4,4'-methylene bis (phenylisocyanate) to form a polyurethane polymer ("one-shot" method). This polymer was extruded into strips and then tested for physical properties and paint adhesion as set forth in Comparative Example A.

The polyurethane elastomer produced exhibited the following test results:

| | |
|---|---|
| Tensile Strength, psi | 2819 |
| Elongation, % | 580 |
| Die C Tear, lbs/in | 388 |
| Clash Berg | −47° C |
| Tape Adhesion Test - 20 minutes | FAIL |
| 30 minutes | FAIL |

COMPARATIVE EXAMPLE C

A poly (oxypropylene)-poly (oxyethylene-oxypropylene) glycol based polyurethane elastomer was prepared and tested as follows.

In a manner similar to that described in Comparative Example B, a polyol was prepared consisting of a 2000 molecular weight poly (oxypropylene) glycol with a 45 percent poly (oxyethylene) tip containing 1–2% poly (oxypropylene). One mole of this polyol was reacted with six moles of 4,4'-methylene bis (phenyl isocyanate) and five moles of 1,4-butane diol to form a polyurethane polymer.

The resulting polymer was extruded into strips and tested as in Comparative Example B.

The following test results were obtained:

| | |
|---|---|
| Tensile, psi | 2970.84 |
| Elongation, % | 466.67 |
| Die C Tear, lbs/in | 393.93 |
| Clash Berg | −49.45° C |
| Tape Adhesion Test - 20 minutes | FAIL |
| 30 minutes | FAIL |

COMPARATIVE EXAMPLE D

A poly (oxypropylene-oxyethylene) glycol based polyurethane elastomer was prepared and tested as follows.

In a manner similar to that described in Comparative Example B, a 2000 molecular weight polyol was prepared consisting of a poly (oxypropylene) glycol containing 45 percent ethylene oxide randomly distributed over the entire length of the molecule.

One mole of this polyol was combined with six moles of 4,4'-methylene bis (phenyl isocyanate) and five moles of 1,4-butane diol to produce a polyurethane elastomeric product. This elastomer was extruded and tested (as in Comparative Example B) and the following results were obtained:

| | |
|---|---|
| Tensile, psi | 3359.8 |
| Elongation, % | 310 |
| Die C Tear, lbs/in | — |
| Clash Berg | — |
| Tape Adhesion - 20 minutes | FAIL |
| 30 minutes | FAIL |

EXAMPLE I

A poly (oxypropylene)-poly (oxyethylene-oxypropylene) glycol based polyurethane elastomer, according to the present invention, was prepared and tested as follows.

A 2000 molecular weight polyol was formulated by block oxypropylating a dipropylene glycol initiator to a hydroxyl number of 106.8 (1050 MW), followed by random oxyalkylation with a mixture of 90 percent ethylene oxide and 10 percent propylene oxide to a final hydroxyl number of 56.0. This polyol (one mole) was combined with six moles of 4,4'-methylene bis (phenyl isocyanate) and five moles of 1,4-butane diol. The resulting polyurethane elastomer was extruded and subjected to testing as in Comparative Example B. The following results were obtained:

| | |
|---|---|
| Tensile, psi | 3382 |
| Elongation, % | 460 |
| Die C Tear, lbs/in | 325 |
| Clash Berg | −31.71° C |
| Tape Adhesion - 20 minutes | PASS |
| 30 minutes | PASS |

EXAMPLE II

A poly (oxypropylene)-poly (oxyethylene-oxypropylene) glycol based polyurethane elastomer was prepared and tested as follows.

Dipropylene glycol, as an initiator, was block oxypropylated to a hydroxyl number of 106.8 (1050 MW), followed by random oxyalkylation with a mixture of 95 percent ethylene oxide and 5 percent propylene oxide to a final hydroxyl number of 56.0 (2000 MW). One mole of this polyol was combined with six moles of 4,4-methylene bis (phenyl isocyanate) and five moles of 1,4-butane diol to produce a polyurethane elastomer. This elastomer product was extruded and tested for paint adhesion as described in Comparative Example B. Both the 20-minute and 30-minute samples PASSED the paint adhesion test.

We claim:

1. A polyurethane elastomer with improved paint adhesion properties comprising the reaction product of an organic diisocyanate, a chain extender and a polyether polyol having a molecular weight of about 1,500 to about 3,000 prepared by oxyalkylation of (a) a poly (oxypropylene) glycol precursor which precursor is the condensation product of propylene oxide and a difunctional active hydrogen-containing initiator with (b) a random capping mixture of ethylene oxide and about 3 to about 15 percent by weight propylene oxide to produce a polyether polyol including about 30 to about 60 percent by weight oxyethylene content.

2. The polyurethane elastomer of claim 1 wherein the molecular weight of the polyol ranges from about 1,750 to about 2,500.

3. The polyurethane elastomer of claim 2 wherein the molecular weight of the polyol is about 2,000.

4. The polyurethane elastomer of claim 1 wherein the polyol is prepared by random oxyalkylation of a poly (oxypropylene) glycol with a mixture of ethylene oxide and about 5 to about 10 percent propylene oxide.

5. The polyurethane elastomer of claim 4 wherein the polyol is a poly (oxypropylene) glycol oxyalkylated with a mixture of ethylene oxide and about 5 percent propylene oxide.

6. The polyurethane elastomer of claim 1 wherein the polyol comprises about 40 to about 50 percent by weight oxyethylene.

7. The polyurethane elastomer of claim 6 wherein the polyol comprises about 45 percent oxyethylene.

8. The polyurethane elastomer of claim 1 wherein the organic diisocyanate reactant is selected from the group consisting of tolylene diisocyanate, methylene bis (phenyl isocyanate), bidenzyl diisocyanate, phenylene diisocyanate, and hexamethylene diisocyanate.

9. The polyurethane elastomer of claim 8 wherein the organic diisocyanate reactant is selected from the group consisting of tolylene diisocyanate and methylene bis (phenyl isocyanate).

10. The polyurethane elastomer of claim 9 wherein the organic diisocyanate reactant is 4,4'-methylene bis (phenyl isocyanate).

11. The polyurethane elastomer of claim 1 wherein the chain extender reactant is an aliphatic diol selected from the group consisting of ethylene glycol, propylene glycol, butane diol, pentane diol, and hexane diol.

12. The polyurethane elastomer of claim 11 wherein the chain extender is 1,4-butane diol.

13. The polyurethane elastomer of claim 1 wherein the polyol reactant is prepared by random oxyalkylation of a poly (oxypropylene) glycol based on a glycol initiator selected from the group consisting of water, propylene glycol, dipropylene glycol, tripropylene glycol, ethylene glycol, butylene glycol, and butane diol.

14. The polyurethane elastomer of claim 13 wherein the polyol is prepared by random oxyalkylation of a poly (oxypropylene) glycol based on a dipropylene glycol initiator.

15. The polyurethane elastomer of claim 1 comprising the reaction product of an organic diisocyanate, a chain extender, and a poly (oxyalkylene) glycol having a molecular weight of about 1,750 to about 2,500, prepared by random oxyalkylation of a poly (oxypropylene) glycol precursor with a mixture of ethylene oxide and about 5 to about 10 percent propylene oxide to produce a polyol including about 40 to about 50 percent by weight oxyethylene content.

16. The polyurethane elastomer of claim 15 comprising the reaction product of 4,4'-methylene bis (phenyl isocyanate), 1,4-butane diol, and a poly (oxyalkylene) glycol having a molecular weight of about 2,000, prepared by random oxyalkylation of poly (oxypropylene) to produce a polyol comprising about 45 percent by weight oxyethylene content.

17. The polyurethane elastomer of claim 16 wherein the poly (oxypropylene) glycol reactant is based on a dipropylene glycol initiator.

18. In a process of fabricating flexible automotive body parts from polyurethane elastomers, the improvement characterized by using the polyurethane elastomer of claim 1 to produce a part with improved paint adhesion properties.

19. In a process of fabricating flexible automotive body parts from polyurethane elastomers, the improvement characterized by using the polyurethane elastomer of claim 15 to produce a part with improved paint adhesion properties.

20. In a process of fabricating flexible automotive body parts from polyurethane elastomers, the improvement characterized by using the polyurethane elastomer of claim 16 to produce a part with improved paint adhesion properties.

21. In a process of fabricating flexible automotive body parts from polyurethane elastomers, the improvement characterized by using the polyurethane elastomer of claim 17 to produce a part with improved paint adhesion properties.

* * * * *